(12) United States Patent
Choi et al.

(10) Patent No.: US 12,240,288 B2
(45) Date of Patent: Mar. 4, 2025

(54) VEHICLE AIR CONDITIONER

(71) Applicants: Hyundai Motor Company, Seoul (KR); Kia Corporation, Seoul (KR); Hanon Systems, Daejeon (KR)

(72) Inventors: Jae Sik Choi, Suwon-si (KR); Byeong Moo Jang, Suwon-si (KR); Yun A Choi, Suwon-si (KR); Young Tae Song, Gwangmyeong-si (KR); Sung Been Cheon, Daejeon (KR); Jin Uk Kim, Daejeon (KR); Jong Su Kim, Daejeon (KR); In Keun Kang, Daejeon (KR); Sang Chul Byun, Daejeon (KR)

(73) Assignees: Hyundai Motor Company, Seoul (KR); Kia Corporation, Seoul (KR); Hanon Systems, Daejeon (KR)

( * ) Notice: Subject to any disclaimer, the term of this patent is extended or adjusted under 35 U.S.C. 154(b) by 238 days.

(21) Appl. No.: 17/978,339

(22) Filed: Nov. 1, 2022

(65) Prior Publication Data
US 2023/0331059 A1    Oct. 19, 2023

(30) Foreign Application Priority Data
Apr. 14, 2022  (KR) .................. 10-2022-0046474

(51) Int. Cl.
*B60H 1/00*    (2006.01)

(52) U.S. Cl.
CPC ..... *B60H 1/00028* (2013.01); *B60H 1/00021* (2013.01); *B60H 2001/00135* (2013.01)

(58) Field of Classification Search
CPC ...... B60H 2001/00092; B60H 1/00021; B60H 1/00028; B60H 1/00035; B60H 1/00071;
(Continued)

(56) References Cited

U.S. PATENT DOCUMENTS 6,308,770 B1    10/2001  Shikata et al.
2012/0168117 A1*  7/2012  Jairazbhoy ......... B60H 1/00514
                                                    165/59
(Continued)

FOREIGN PATENT DOCUMENTS

JP    2526852 B2    8/1996
JP    H1071846 A    3/1998
(Continued)

*Primary Examiner* — Frantz F Jules
*Assistant Examiner* — Jason N Thompson
(74) *Attorney, Agent, or Firm* — Slater Matsil, LLP (57) ABSTRACT

An embodiment vehicle air conditioner includes an air conditioning device connected to a blower device to receive air supplied from the blower device, a heat exchange core provided in the air conditioning device and disposed in parallel with a flow direction of the air supplied from the blower device, a partition wall disposed to divide the heat exchange core into a first core part disposed to be close in distance to the blower device and a second core part disposed to be distant from the blower device, such that the air supplied from the blower device is distributed and supplied to the first core part and the second core part, and an air guide provided in a connection portion between the blower device and the air conditioning device and configured to guide the air to be supplied to the second core part of the heat exchange core.

20 Claims, 10 Drawing Sheets

(58) Field of Classification Search
CPC ...... B60H 2001/00135; B60H 1/00557; B60H 1/00564
See application file for complete search history.

(56) References Cited

U.S. PATENT DOCUMENTS

| | | | |
|---|---|---|---|
| 2017/0291468 A1* | 10/2017 | Jung | B60H 1/00678 |
| 2017/0349026 A1* | 12/2017 | Kim | B60H 1/00671 |
| 2018/0162192 A1 | 6/2018 | Lee et al. | |
| 2019/0176569 A1* | 6/2019 | Hensler | B60H 1/00521 |
| 2020/0298660 A1 | 9/2020 | Cho et al. | |
| 2022/0055443 A1* | 2/2022 | Sakurai | B60H 1/00564 |

FOREIGN PATENT DOCUMENTS

| | | | | |
|---|---|---|---|---|
| JP | 2000203244 A | | 7/2000 | |
| JP | 3432349 B2 | | 8/2003 | |
| JP | 3518102 B2 | | 4/2004 | |
| JP | 3985629 B2 | | 10/2007 | |
| JP | 2008207611 A | * | 9/2008 | ......... B60H 1/00028 |
| KR | 101258712 B1 | | 4/2013 | |
| KR | 101266929 B1 | | 5/2013 | |
| KR | 20150021713 A | | 3/2015 | |
| KR | 101632181 B1 | | 6/2016 | |
| KR | 20180068761 A | | 6/2018 | |
| KR | 20200069522 A | | 6/2020 | |
| WO | WO-2020230548 A1 | * | 11/2020 | ......... B60H 1/00021 |

\* cited by examiner

VEHICLE AIR CONDITIONER

CROSS-REFERENCE TO RELATED APPLICATIONS

This application claims the benefit of Korean Patent Application No. 10-2022-0046474, filed on Apr. 14, 2022, which application is hereby incorporated herein by reference.

TECHNICAL FIELD

The present invention relates to a technology related to an air conditioner for cooling and heating a vehicle interior.

BACKGROUND

In general, a vehicle air conditioner refers to a device configured to heat or cool a vehicle interior by introducing outside air into the vehicle interior or circulating air in the vehicle interior. The vehicle air conditioner includes a blower device configured to introduce inside air or outside air and blow the air and an air conditioning device configured to condition the air blown from the blower device and discharge the air to the vehicle interior.

The foregoing explained as the background is intended merely to aid in the understanding of the background of embodiments of the present invention, and is not intended to mean that the present invention falls within the purview of the related art that is already known to those skilled in the art.

SUMMARY

Embodiments of the present invention may solve problems in the art and aim to provide a vehicle air conditioner in which air blown from a blower device is more uniformly distributed and discharged by an air conditioning device, thereby enabling accurate and reliable airflow rate control in response to a user's manipulation and improving comfort of a vehicle interior.

An embodiment of the present invention provides a vehicle air conditioner including an air conditioning device connected to a blower device so as to receive air blown from the blower device, a heat exchange core provided in the air conditioning device and disposed in parallel with a flow direction of the air supplied from the blower device, a partition wall installed to divide the heat exchange core into a first core part disposed to be close in distance to the blower device and a second core part disposed to be distant from the blower device, such that the air supplied from the blower device is distributed and supplied to the first core part and the second core part, and an air guide provided in a connection portion between the blower device and the air conditioning device and configured to guide the air to be supplied to the second core part of the heat exchange core.

The air guide may be installed to guide a part of the air, which flows at a high flow velocity in the air blown from the blower device, toward the second core part of the heat exchange core.

The blower device may include a blower fan having a rotation axis perpendicular to a plane defined by the heat exchange core, and the air guide is installed to guide the air, which is discharged in a tangential direction of the blower fan, toward the second core part of the heat exchange core.

The heat exchange core of the air conditioning device may be installed to define a vertical surface, the blower device may include a blower fan having a rotation axis perpendicular to a plane defined by the heat exchange core, and the air guide may be installed to guide the air, which is positioned below the connection portion between the air conditioning device and the blower device, toward the second core part of the heat exchange core.

The air guide may be installed at an outlet side of the blower device in the connection portion between the blower device and the air conditioning device.

The air guide may be installed at an inlet side of the air conditioning device in the connection portion between the blower device and the air conditioning device.

The air guide may be horizontally disposed at a lower side of an inlet of the air conditioning device.

The air guide may be inclined and disposed at a lower side of an inlet of the air conditioning device.

When one end of the partition wall is projected onto the inlet of the air conditioning device, and the inlet is divided vertically in half into a first inlet portion through which air is easily directed toward the first core part and a second inlet portion through which air is easily directed toward the second core part, the air guide may be inclined downward from the first inlet portion toward the second inlet portion.

When viewing the blower fan and the heat exchange core from above, the partition wall may have an 'L'-shaped cross-section in which one end thereof is directed toward the blower fan and the other end thereof is directed toward the heat exchange core, and the air guide may be inclined downward from a portion of the inlet of the air conditioning device through which air is easily directed toward the first core part of the heat exchange core by the partition wall toward a portion of the inlet of the air conditioning device through which air is easily directed toward the second core part of the heat exchange core by the partition wall.

An adjustment door may be disposed between the partition wall and the air guide and adjusts a ratio at which the air blown from the blower fan flows into the first core part and the second core part of the heat exchange core, and the air guide may be installed to be spaced apart from the adjustment door.

When one end of the partition wall is projected onto the inlet of the air conditioning device, and the inlet is divided vertically in half into a first inlet portion through which air is easily directed toward the first core part and a second inlet portion through which air is easily directed toward the second core part, the air guide may be provided only in the second inlet portion.

The air guide may be provided in the inlet of the air conditioning device and horizontally disposed at a position lower than a height of a center of the heat exchange core.

When one end of the partition wall is projected onto the inlet of the air conditioning device, and the inlet is divided vertically in half into a first inlet portion through which air is easily directed toward the first core part and a second inlet portion through which air is easily directed toward the second core part, the air guide may be formed within a range lower than a height of a center of the heat exchange core and have a plate shape inclined from the first inlet portion toward the second inlet portion.

The air guide may have a rectilinear cross-section horizontally formed in a direction from the blower device toward the air conditioning device.

The air guide may have a wedge-shaped cross-section having an upper surface gradually inclined upward in a direction from the blower device toward the air conditioning device.

The heat exchange core may be an evaporator core.

According to embodiments of the present invention, the air blown from the blower device may be more uniformly distributed and discharged by the air conditioning device, thereby enabling accurate and reliable airflow rate control in response to the user's manipulation and improving the comfort of the vehicle interior.

DETAILED DESCRIPTION OF ILLUSTRATIVE EMBODIMENTS

Specific structural or functional descriptions of embodiments of the present invention disclosed in this specification or application are exemplified only for the purpose of explaining the embodiments according to the present invention, the embodiments according to the present invention may be carried out in various forms, and it should not be interpreted that the present invention is limited to the embodiments described in this specification or application.

Because the embodiments according to the present invention may be variously changed and may have various forms, specific embodiments will be illustrated in the drawings and described in detail in the present specification or application. However, the descriptions of the specific embodiments are not intended to limit embodiments according to the concept of the present invention to the specific embodiments, but it should be understood that the present invention covers all modifications, equivalents and alternatives falling within the spirit and technical scope of the present invention.

The terms such as "first" and/or "second" may be used to describe various constituent elements, but these constituent elements should not be limited by these terms. These terms are used only for the purpose of distinguishing one constituent element from other constituent elements. For example, without departing from the scope according to the concept of the present invention, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used to just describe a specific embodiment and do not intend to limit the present invention. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which the present invention pertains. The terms such as those defined in commonly used dictionaries should be interpreted as having meanings consistent with meanings in the context of related technologies and should not be interpreted as having ideal or excessively formal meanings unless explicitly defined in the present specification.

Hereinafter, the present invention will be described in detail through description of preferred embodiments of the present invention with reference to the accompanying drawings. Like reference numerals indicated in the respective drawings refer to like members.

Referring to FIGS. 1 to 10, a vehicle air conditioner according to embodiments of the present invention includes an air conditioning device 3 connected to a blower device 1 so as to receive air blown from the blower device 1, a heat exchange core 5 provided in the air conditioning device 3 and disposed in parallel with a flow direction of the air supplied from the blower device 1, a partition wall 11 installed to divide the heat exchange core 5 into a first core part 7 disposed to be close in distance to the blower device 1 and a second core part 9 disposed to be distant from the blower device 1, such that the air supplied from the blower device 1 is distributed and supplied to the first core part 7 and the second core part 9, and an air guide 13 provided in a connection portion 4 between the blower device 1 and the air conditioning device 3 and configured to guide the air to be supplied to the second core part 9 of the heat exchange core 5.

The air guide 13 is installed to guide a part of the air, which flows at a high flow velocity in the air blown from the blower device 1, toward the second core part 9 of the heat exchange core 5.

That is, according to embodiments of the present invention, when the air blown from the blower device 1 is distributed and supplied to the first core part 7 and the second core part 9 of the heat exchange core 5 by the partition wall 11, the air guide 13 guides the flowing air so that the air may be more smoothly supplied to the second core part 9 that is relatively distant from the blower device 1 so that a flow rate of the air passing through the second core part 9 is easily decreased.

The blower device 1 includes a blower fan 15 having a rotation axis perpendicular to a plane defined by the heat exchange core 5. The air guide 13 is installed to guide the air, which is discharged in a tangential direction of the blower fan, toward the second core part 9 of the heat exchange core 5.

Figure 5:
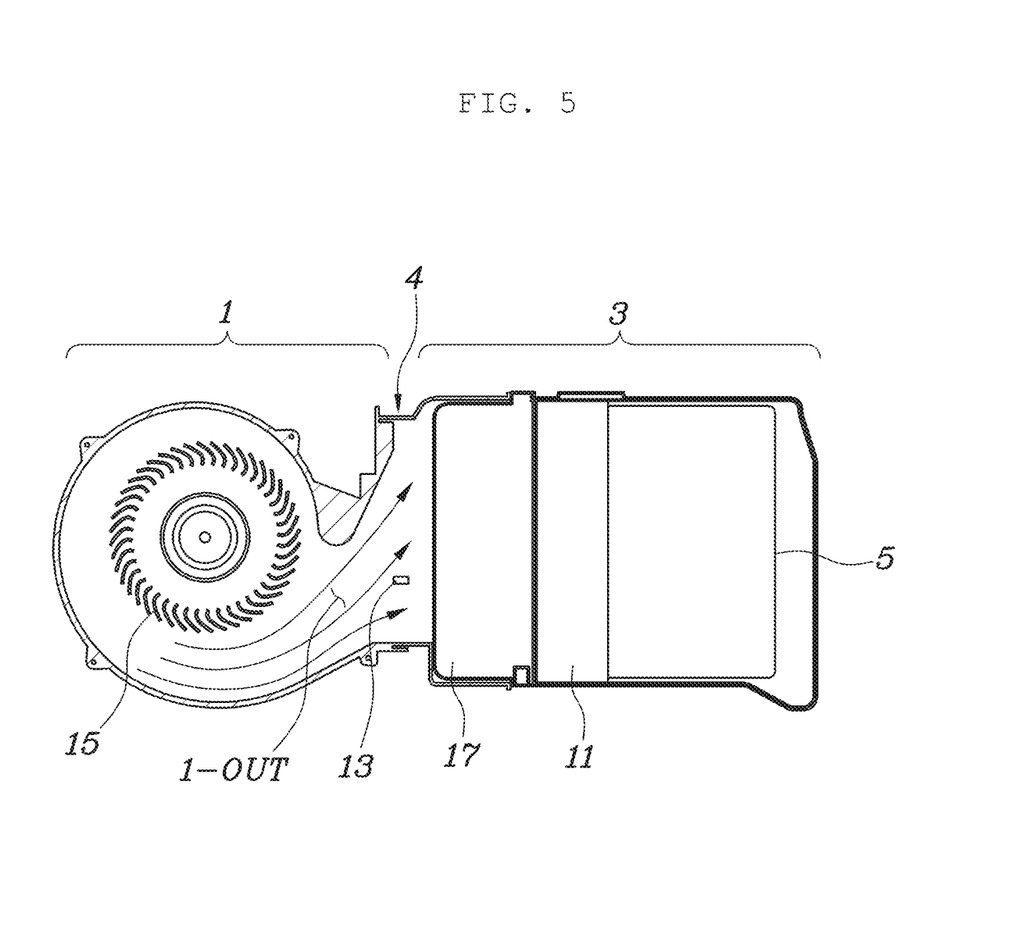
FIG. 5 is a view illustrating the main components according to embodiments of the present invention when viewed in the same direction as FIG. 3.

That is, in a state in which the blower device 1 and the air conditioning device 3 are connected, as illustrated in FIG. 5, the air discharged in the tangential direction of the blower fan 15, which is a part of the air discharged from the blower device 1 toward the air conditioning device 3, flows at the highest flow velocity among the other parts of the air passing through the connection portion 4 between the blower device 1 and the air conditioning device 3. Therefore, the air discharged in the tangential direction of the blower fan 15 is guided by the air guide 13 toward the second core part 9.

Therefore, the mixing of the air guided by the air guide 13 toward the second core part 9 and the other parts of the air with a relatively low flow velocity is delayed, if possible, such that flow resistance is reduced. Therefore, the air guided by the air guide 13 may smoothly flow to the second core part 9 relatively distant from the blower device 1. As a result, a flow rate of air passing through the first core part 7 and a flow rate of air passing through the second core part 9 are at the same level when an adjustment door 17 to be described below is in a neutral state.

In the present embodiments, the heat exchange core 5 of the air conditioning device 3 is installed to define a vertical surface, and the blower fan 15 of the blower device 1 is installed to have a rotation axis in the direction perpendicular to the plane defined by the heat exchange core 5. The air guide 13 is installed to guide the air, which is positioned below the connection portion 4 between the air conditioning device 3 and the blower device 1, toward the second core part 9 of the heat exchange core 5.

That is, a portion below the connection portion 4 between the air conditioning device 3 and the blower device 1 is a portion through which the air discharged in the tangential direction of the blower fan 15 substantially passes. Therefore, the air guide 13 is installed below the connection portion 4 between the air conditioning device 3 and the blower device 1.

The air guide 13 may be installed at an outlet side of the blower device 1 or an inlet side of the air conditioning device 3 in the connection portion 4 between the blower device 1 and the air conditioning device 3.

For reference, in the embodiments of the present invention, the air guide 13 is provided in an inlet 19 of the air conditioning device 3.

Figure 6:
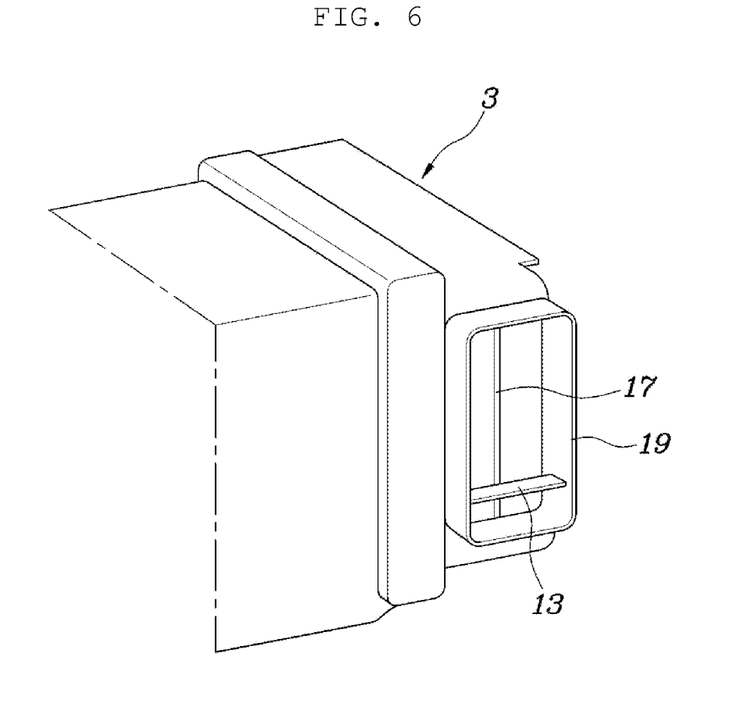
FIG. 6 is a view illustrating an air conditioning device illustrated in FIG. 1 for explaining a first embodiment of the present invention.
Figure 7:
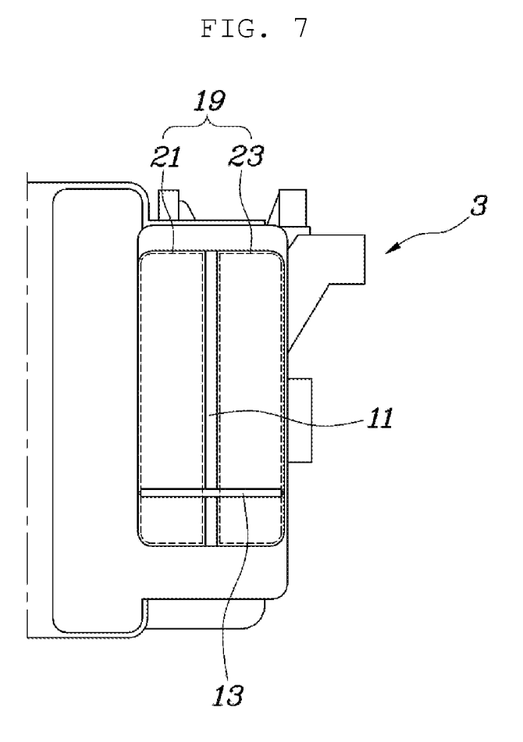
FIG. 7 is a view illustrating the air conditioning device illustrated in FIG. 6 when viewed from an inlet side.

Referring to FIGS. 6 and 7, in the first embodiment of the present invention, the air guide 13 is horizontally disposed at a lower side of the inlet 19 of the air conditioning device 3.

Figure 8:
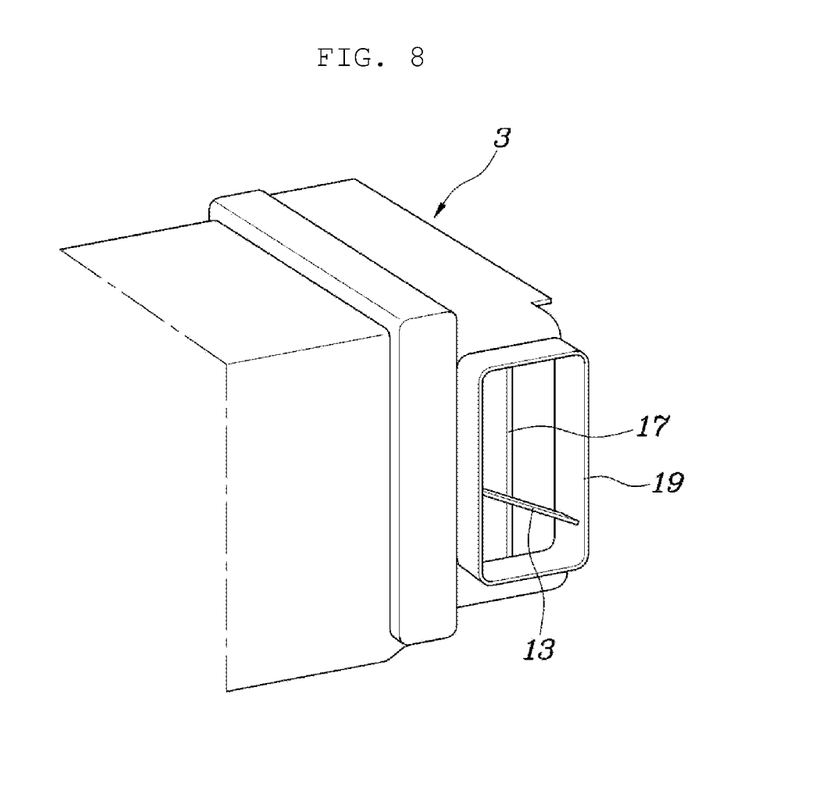
FIG. 8 is a view illustrating the air conditioning device illustrated in FIG. 1 for explaining a second embodiment of the present invention.
Figure 9:
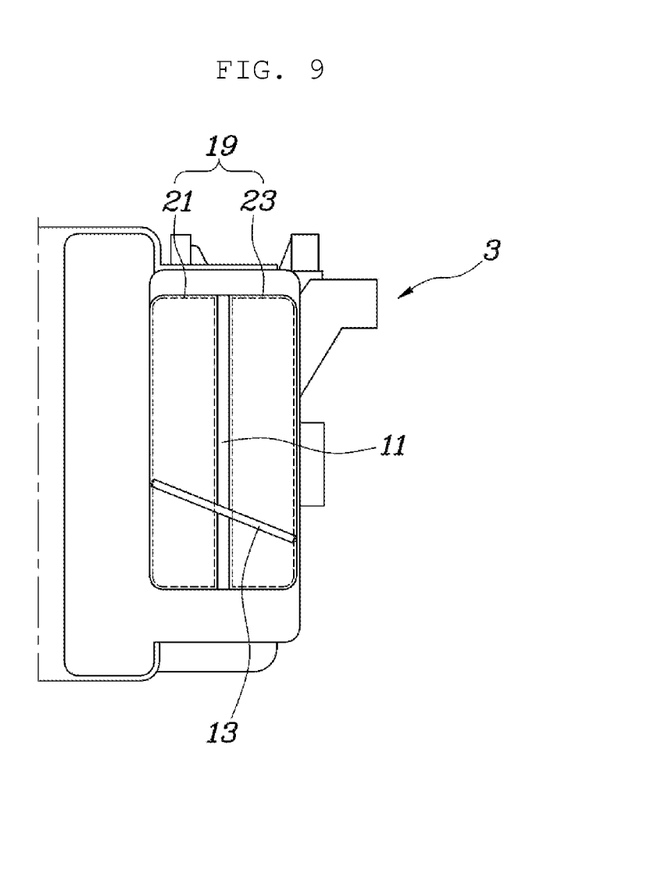
FIG. 9 is a view illustrating the air conditioning device illustrated in FIG. 8 when viewed from the inlet side.

In addition, referring to FIGS. 8 and 9, in the second embodiment of the present invention, the air guide 13 is inclined and disposed at the lower side of the inlet 19 of the air conditioning device 3.

In this case, when one end of the partition wall 11 is projected onto the inlet 19 of the air conditioning device 3, and the inlet 19 is divided vertically in half into a first inlet portion 21 through which the air may be easily directed toward the first core part 7 and a second inlet portion 23 through which the air may be easily directed toward the second core part 9, the air guide 13 is inclined downward from the first inlet portion 21 toward the second inlet portion 23.

Figure 1:
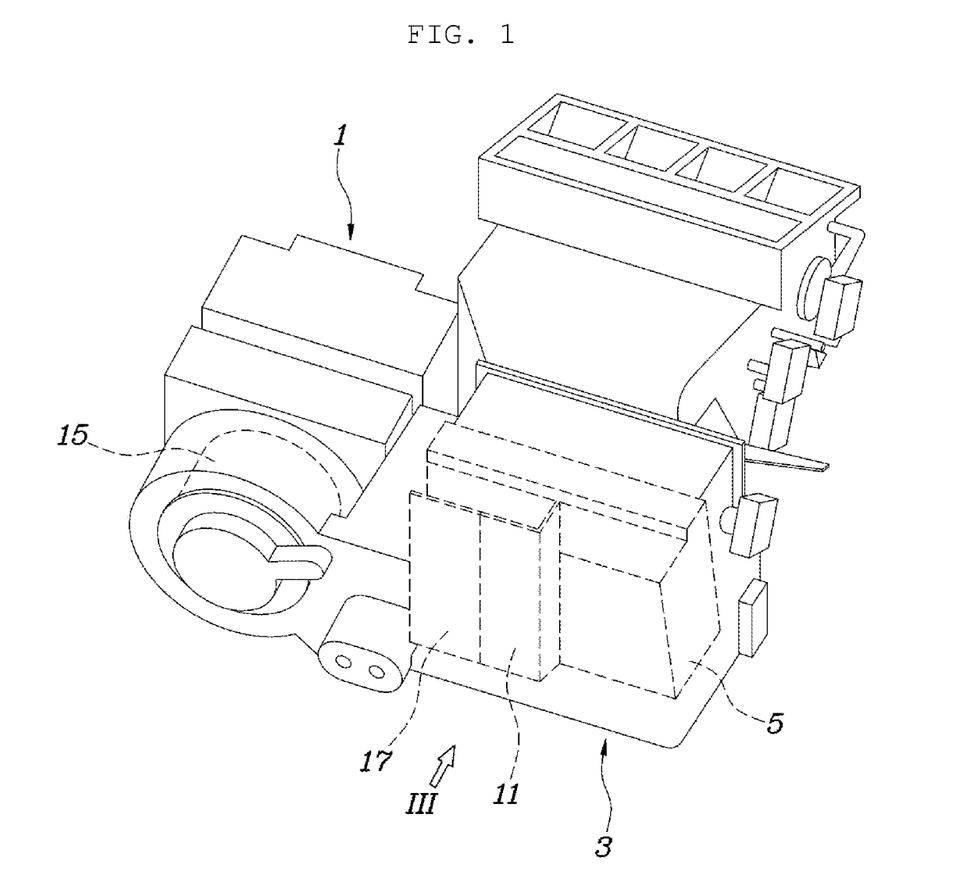
FIG. 1 is a view illustrating a vehicle air conditioner according to embodiments of the present invention.
Figure 2:
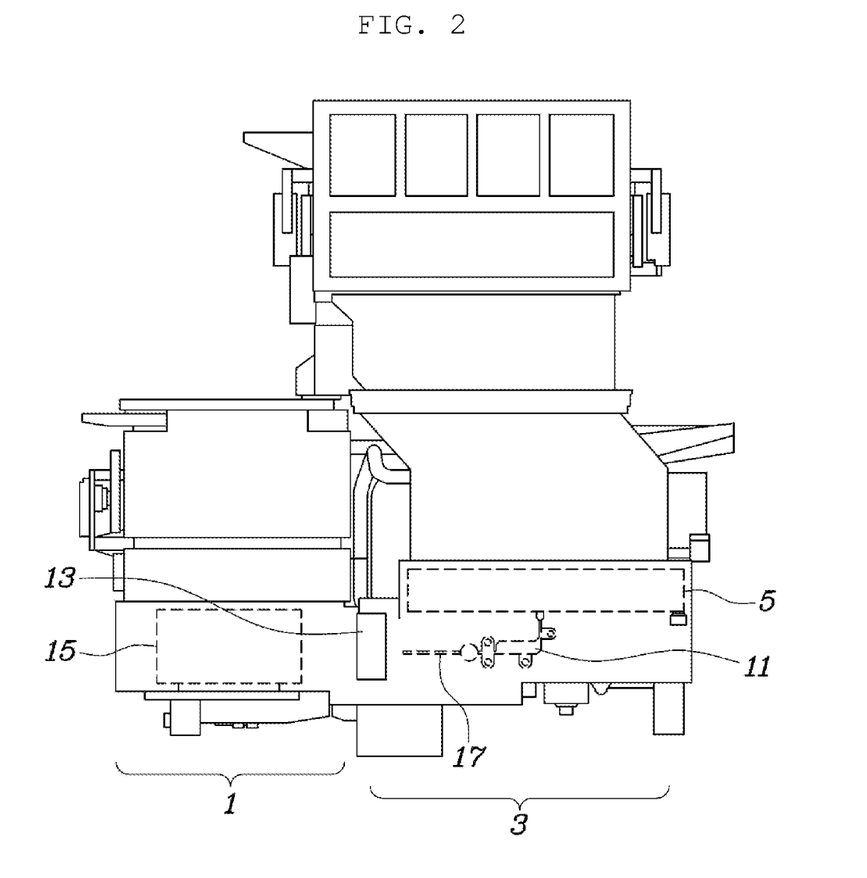
FIG. 2 is a view of the vehicle air conditioner illustrated in FIG. 1 when viewed from above.
Figure 3:
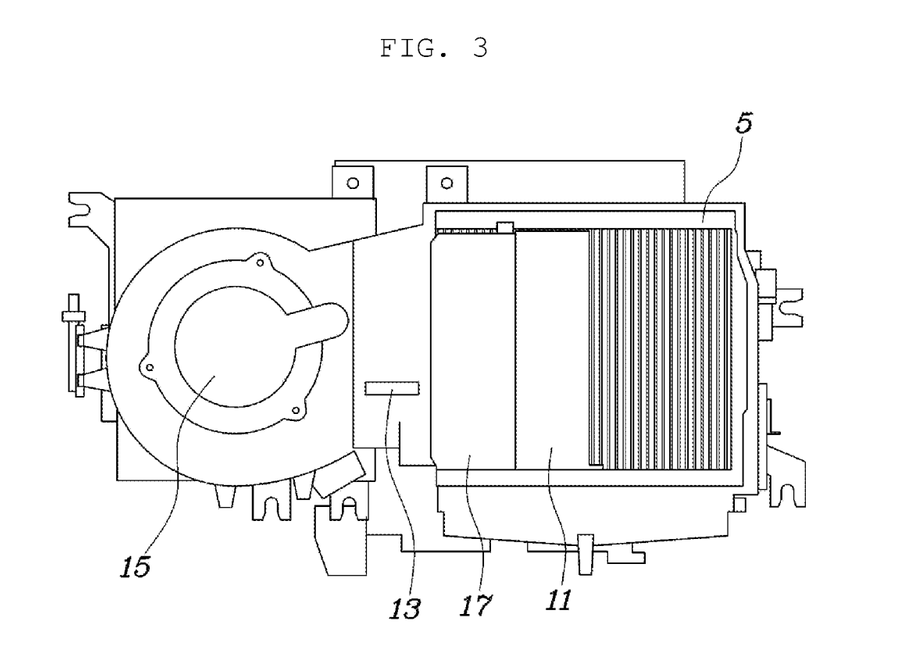
FIG. 3 is a view of the vehicle air conditioner when viewed in direction III in FIG. 1.
Figure 4:
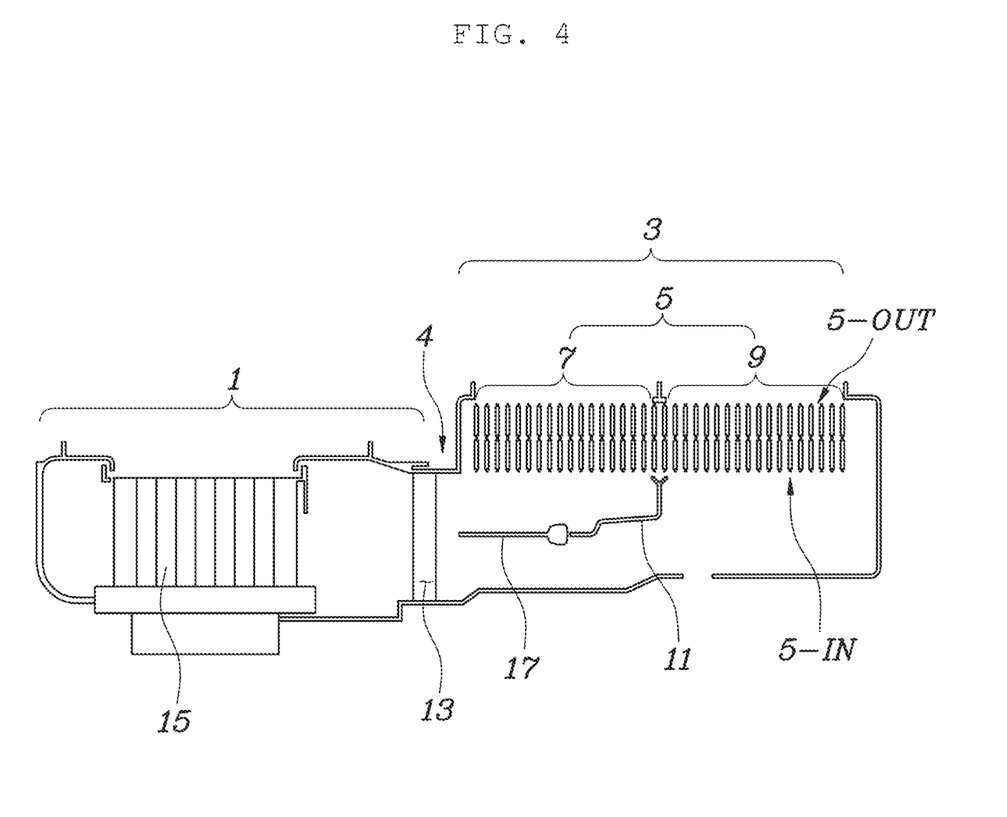
FIG. 4 is a view illustrating the main components according to embodiments of the present invention when viewed in the same direction as FIG. 2.

That is, when viewing the blower fan 15 and the heat exchange core 5 from above as illustrated in FIG. 4, the partition wall 11 has an 'L'-shaped cross-section in which one end thereof is directed toward the blower fan 15 and the other end thereof is directed toward the heat exchange core 5. The air guide 13 is inclined downward from the first inlet portion 21 of the inlet 19 of the air conditioning device 3 through which the air is easily directed toward the first core part 7 of the heat exchange core 5 by the partition wall 11 toward the second inlet portion 23 through which the air is easily directed toward the second core part 9 of the heat exchange core 5 by the partition wall 11.

In this case, the expression "the air passing through the first inlet portion 21 is easily directed toward the first core part 7" and the expression "the air passing through the second inlet portion 23 is easily directed toward the second core part 9" may mean that the air passing through the first inlet portion 21 is mainly directed toward the first core part 7 because the partition wall 11 is substantially spaced apart from the inlet 19 of the air conditioning device 3 and thus the air passing through the first inlet portion 21 and the air passing through the second inlet portion 23 may be mixed. However, the expressions do not definitely mean that the entire air passing through the first inlet portion 21 is supplied to the first core part 7. The expressions are made because it cannot be definitely said that the entire air is supplied to the second core part 9 even though the air passing through the second inlet portion 23 is mainly directed toward the second core part 9.

Meanwhile, the adjustment door 17 is disposed between the partition wall 11 and the air guide 13 and adjusts a ratio at which the air blown from the blower fan 15 flows into the first core part 7 and the second core part 9 of the heat exchange core 5. The air guide 13 is installed to be spaced apart from the adjustment door 17.

Therefore, a part of the air passing through an upper side of the air guide 13 and a part of the air passing through a lower side of the air guide 13 may be mixed. When a pressure difference occurs because a flow velocity of the air passing through the lower side of the air guide 13 is relatively high, a part of the air passing through the upper side of the air guide 13, together with the air passing through the lower side of the air guide 13, may be directed toward the second core part 9.

Of course, the adjustment door 17 is configured to adjust a ratio of air directed toward the first core part 7 and the second core part 9 by being rotated in accordance with the user's manipulation.

Meanwhile, in the case in which the inlet 19 of the air conditioner is divided into the first inlet portion 21 and the second inlet portion 23 as described above, the air guide 13 may be provided only in the second inlet portion 23.

That is, because the air passing through the second inlet portion 23 is mainly supplied to the second core part 9, the above-mentioned effect may be obtained even though the air guide 13 is installed only in the second inlet portion 23.

However, according to the experiments, the above-mentioned effect may also be obtained even in the case in which the air guide 13 is provided in the first inlet portion 21. Therefore, like the embodiments illustrated in FIGS. 6 to 9, the air guide 13 may be installed over the entire first and second inlet portions 21 and 23 in consideration of structural stability and durability of the air conditioner.

The air guide 13 may be provided in the inlet 19 of the air conditioning device 3 and horizontally disposed at a position lower than a height of a center of the heat exchange core 5.

That is, as described above, the air guide 13 may be installed at a center lower side based on a height of the inlet 19 of the air conditioning device 3 or the connection portion 4 between the blower device 1 and the air conditioning device 3. However, as described above, the air guide 13 may be installed at a lower side based on a height of a center of the heat exchange core 5. The center of the inlet 19 of the air conditioning device 3 is substantially and almost coincident with a center of the evaporator.

Therefore, in the second embodiment illustrated in FIGS. 8 and 9, when the inlet 19 of the air conditioning device 3 is divided vertically in half into the first inlet portion 21 and the second inlet portion 23, the air guide 13 is formed within a range lower than a height of the center of the heat exchange core 5 and has a plate shape inclined from the first inlet portion 21 toward the second inlet portion 23.

In the first and second embodiments, the air guide 13 may have a rectilinear cross-section horizontally formed in a direction from the blower device 1 toward the air conditioning device 3.

That is, in this case, the air guide 13 has a cross-sectional structure illustrated in FIG. 5, such that the air flowing from the blower device 1 toward the air conditioning device 3 may be distributed to the upper and lower sides and flow smoothly.

Figure 10:
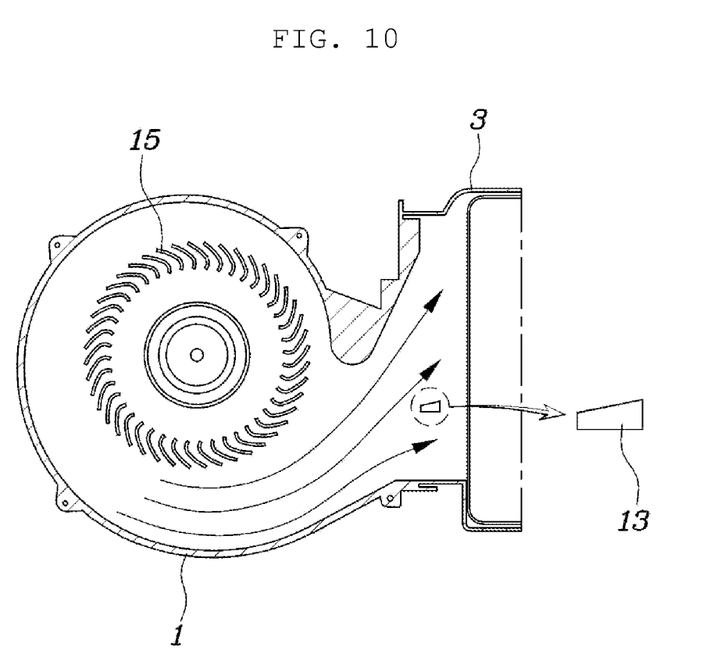
FIG. 10 is a view for explaining a third embodiment of the present invention when viewed in the same direction as FIG. 3.

Meanwhile, in the third embodiment of the present invention illustrated in FIG. 10, a cross-sectional structure of the air guide 13 may have a wedge-shaped cross-section having an upper surface gradually inclined upward in a direction from the blower device 1 toward the air conditioning device 3. The other components according to the third embodiment of the present invention are identical to those in the first or second embodiment.

In this case, a flow of air flowing through a lower side of the air guide 13 and a flow of air flowing through an upper side of the air guide 13 may be more assuredly separated.

Meanwhile, the heat exchange core 5 may be an evaporator core or a heater core.

As described above, according to embodiments of the present invention, the air blown from the blower fan 15 is separated, by the air guide 13 in the inlet 19 of the air conditioning device 3, into the air flowing through the lower side at a relatively high flow velocity and the air flowing through the upper side at a relatively low flow velocity and then flows toward the second core part 9. As a result, the amount of air passing through the first core part 7 and the amount of air passing through the second core part 9 are at the same level when the adjustment door 17 is at the neutral position.

Therefore, the user may recognize that accurate and reliable airflow rate control is performed in response to the user's manipulation. Since the desired airflow rate control is accurately performed, it is possible to further improve the comfort of the vehicle interior.

While the specific embodiments of the present invention have been illustrated and described, it will be obvious to those skilled in the art that the present invention may be variously modified and changed without departing from the technical spirit of the present invention defined in the appended claims.

What is claimed is:

1. A vehicle air conditioner comprising:
   an air conditioning device connected to a blower device to receive air supplied from the blower device;
   a heat exchange core provided in the air conditioning device, the heat exchange core having an inlet surface and an outlet surface that are parallel with a flow direction of the air supplied from the blower device;
   a partition wall disposed to divide the heat exchange core into a first core part and a second core part, such that the air supplied from the blower device is distributed and supplied to the first core part and the second core part;
   a blower fan having a rotational axis perpendicular to the inlet surface of the heat exchange core;
   an adjustment door installed upstream of the partition wall and configured to adjust a ratio of air blown from the blower fan into the first core part and the second core part; and
   an air guide provided in a connection portion between the blower device and the air conditioning device, the air guide configured to separate air discharged from a discharge port of the blower device, opened to one side relative to the rotational axis of the blower fan, into two parts and to supply both parts to the adjustment door, wherein the first core part is located between the blower device and the second core part along an imaginary straight line that follows the flow direction of the air supplied from the blower device to the air conditioning device.

2. The vehicle air conditioner of claim 1, wherein the air guide is installed within the connection portion with the discharge port offset to one side in a direction eccentric to the rotational axis of the blower fan.

3. The vehicle air conditioner of claim 2, wherein the air guide is located to guide the air that is discharged in a tangential direction of the blower fan toward the second core part of the heat exchange core.

4. The vehicle air conditioner of claim 2, wherein the air guide is located to direct a lower portion of air passing through the connection portion between the air conditioning device and the blower device toward the second core part of the heat exchange core.

5. The vehicle air conditioner of claim 4, wherein the air guide is located at an outlet side of the blower device in the connection portion between the blower device and the air conditioning device.

6. The vehicle air conditioner of claim 4, wherein the air guide is located at an inlet side of the air conditioning device in the connection portion between the blower device and the air conditioning device.

7. The vehicle air conditioner of claim 4, wherein the air guide is horizontally disposed at a lower side of an inlet of the air conditioning device.

8. The vehicle air conditioner of claim 4, wherein the air guide is inclined and disposed at a lower side of an inlet of the air conditioning device.

9. The vehicle air conditioner of claim 8, wherein, when a first end of the partition wall is projected onto the inlet of the air conditioning device and the inlet is divided vertically in half into a first inlet portion through which the air is directed toward the first core part and a second inlet portion through which the air is directed toward the second core part, the air guide is inclined downward from the first inlet portion toward the second inlet portion.

10. The vehicle air conditioner of claim 8, wherein, when viewing the blower fan and the heat exchange core from above, the partition wall has an 'L'-shaped cross-section in which a first end thereof is directed toward the blower fan and a second end thereof is directed toward the heat exchange core, and the air guide is inclined downward from a portion of the inlet of the air conditioning device through which the air is easily directed toward the first core part of the heat exchange core by the partition wall toward a portion of the inlet of the air conditioning device through which the air is easily directed toward the second core part of the heat exchange core by the partition wall.

11. The vehicle air conditioner of claim 4, wherein the air guide is disposed spaced apart from the adjustment door.

12. The vehicle air conditioner of claim 4, wherein, when a first end of the partition wall is projected onto an inlet of the air conditioning device and the inlet is divided vertically in half into a first inlet portion through which the air is directed toward the first core part and a second inlet portion through which the air is directed toward the second core part, the air guide is provided only in the second inlet portion.

13. The vehicle air conditioner of claim 4, wherein the air guide is provided in an inlet of the air conditioning device and is horizontally disposed at a position lower than a height of a center of the heat exchange core.

14. The vehicle air conditioner of claim 4, wherein, when a first end of the partition wall is projected onto an inlet of the air conditioning device and the inlet is divided vertically in half into a first inlet portion through which the air is directed toward the first core part and a second inlet portion through which the air is directed toward the second core part, the air guide is provided within a range lower than a height of a center of the heat exchange core and has a plate shape inclined from the first inlet portion toward the second inlet portion.

15. The vehicle air conditioner of claim 4, wherein the air guide has a rectilinear cross-section horizontally disposed in a direction from the blower device toward the air conditioning device.

16. The vehicle air conditioner of claim 4, wherein the air guide has a wedge-shaped cross-section having an upper surface gradually inclined upward in a direction from the blower device toward the air conditioning device.

17. The vehicle air conditioner of claim 1, wherein the heat exchange core comprises an evaporator core.

18. A method of providing a vehicle air conditioner, the method comprising:
providing an air conditioning device connected to a blower device such that the air conditioning device receives air supplied from the blower device;
providing a heat exchange core in the air conditioning device having an inlet surface and an outlet surface that are parallel with a flow direction of the air supplied from the blower device;
providing a partition wall that divides the heat exchange core into a first core part and a second core part, such that the air supplied from the blower device is distributed and supplied to the first core part and the second core part;
providing a blower fan with a rotational axis perpendicular to the inlet surface of the heat exchange core;
providing an adjustment door installed upstream of the partition wall to adjust a ratio of air blown from the blower fan into the first core part and the second core part; and
providing an air guide in a connection portion between the blower device and the air conditioning device, which separates air discharged from a discharge port of the blower device, opened to one side relative to the rotational axis of the blower fan, into two parts and supplies both parts to the adjustment door, wherein the first core part is located between the blower device and the second core part along an imaginary straight line that follows the flow direction of the air supplied from the blower device to the air conditioning device.

19. The method of claim 18, wherein the air guide is installed within the connection portion with the discharge port offset to one side in a direction eccentric to the rotational axis of the blower fan.

20. The method of claim 19, wherein the heat exchange core of the air conditioning device defines a vertical surface, and the air guide directs a lower portion of an air passing through the connection portion between the air conditioning device and the blower device toward the second core part of the heat exchange core.

\* \* \* \* \*